United States Patent [19]

Newman et al.

[11] Patent Number: 4,919,009

[45] Date of Patent: Apr. 24, 1990

[54] TWO TURBINE VARIABLE SPEED FLUID COUPLING MARINE TRANSMISSION

[75] Inventors: Neil A. Newman, Omro, Wis.; Thomas C. Bowen, Thousand Oaks, Calif.

[73] Assignee: Brunswick Corporation, Skokie, Ill.

[21] Appl. No.: 232,703

[22] Filed: Aug. 16, 1988

[51] Int. Cl.⁵ .......................................... F16H 47/08
[52] U.S. Cl. .................................................... 475/44
[58] Field of Search ................. 74/730, 731, 732, 679, 74/688; 440/5

[56] References Cited

U.S. PATENT DOCUMENTS

| | | | |
|---|---|---|---|
| 2,716,906 | 9/1955 | Seybold | 74/732 X |
| 2,882,751 | 4/1959 | Kelley | 74/732 X |
| 2,892,363 | 6/1959 | Dodge | 74/732 X |
| 2,929,267 | 3/1960 | Wilson | 74/732 X |
| 3,042,162 | 7/1962 | Hause | 74/732 X |
| 3,388,684 | 6/1968 | Gros et al. | 74/732 X |
| 3,407,600 | 10/1968 | Meyer | 60/54 |
| 4,056,986 | 11/1977 | Hobbs | 74/688 |
| 4,289,044 | 9/1981 | Dorpmund et al. | 74/688 |
| 4,413,535 | 11/1983 | Hobbs | 74/688 |
| 4,558,769 | 12/1985 | Neisen | 162/3.31 |
| 4,820,209 | 4/1989 | Newman | 440/74 |

OTHER PUBLICATIONS

Automatic Transmissions, Mathias F. Brejcha, pp. 56-60, 1977.

Primary Examiner—Dwight G. Diehl
Attorney, Agent, or Firm—Andrus, Sceales, Starke & Sawall

[57] ABSTRACT

A fluid coupling transmission is adapted for interposition between the engine and the propulsion unit of a marine drive. The fluid coupling transmission provides variable speed operation in both forward and reverse. A fluid pump is drivingly connected to the engine crankshaft, and is adapted to drive a forward turbine and a reverse turbine. The reverse turbine is disposed between the fluid pump and the forward turbine, and includes a series of variable position vanes for providing variable power output from the transmission. A one way clutch is positioned between the forward turbine and an output shaft of the transmission, and a planetary gearset is disposed between the reverse turbine and the output shaft. A carrier member extends concentrically relative to the output shaft along a portion of its length, and the planet gears of the planetary gearset are pivotably mounted to the carrier member. The carrier member is provided with a clutch mechanism for selectively engaging the output shaft, and a brake band is provided for selectively maintaining the carrier member stationary. The brake band and clutch mechanism are selectively engageable so as to prevent rotation of the output shaft, impart rotation through the reverse turbine and planetary gearset to propel the boat in a reverse direction, or to impart rotation to the output shaft through the forward turbine and the reverse turbine to propel the boat in a forward direction.

13 Claims, 1 Drawing Sheet

TWO TURBINE VARIABLE SPEED FLUID COUPLING MARINE TRANSMISSION

BACKGROUND AND SUMMARY

This invention relates to a transmission system for a marine drive.

In a conventional marine drive, including an engine and a propulsion unit, the engine is directly and mechanically connected to the propeller through a gear box. As a result, the speed of the propeller is directly proportional to the speed of the engine in a ratio established by the gears of the gear box.

It has been recognized that the usual selection of marine drive characteristics provides unsatisfactory boat performance at low-speed operation, such as for trolling or docking. Mechanisms for improving the low-speed performance of a boat are disclosed in copending patent applications Ser. No. 07/255,618 filed Oct. 11, 1988 and 07/118,862 filed Nov. 9, 1987, now U.S. Pat. No. 4,820,209. The former application provides a fluid coupling apparatus in connection with a series of stationary variable position vanes disposed between the pump and turbine components of the fluid coupling. The vanes are movable so as to govern the direction of impingement of fluid on the turbine component of the fluid coupling. The position of the vanes governs the amount of power transferred from the fluid pump to the turbine, as well as the direction of rotation of the turbine. The latter patent discloses a fluid coupling structure including a fluid pump, a forward driven turbine and a reverse, or reaction, driven turbine. The forward and reaction turbines are connected to concentrically extending shafts. Through a series of gears, clutches and brakes, the forward and reverse turbine shafts drive an output shaft in either a first or second rotational direction, for propelling the boat either in a forward or reverse direction.

The present invention is also directed to a structure for providing improved low-speed and variable speed operation of a boat. A fluid coupling is provided between the marine drive engine and the gear box to which the propeller is connected. The fluid coupling includes a rotatable fluid pump connected to the engine and rotatable in response to rotation of the engine crankshaft. A rotatable forward turbine is adapted to be driven by the fluid pump, and a rotatable reverse turbine is also adapted to be driven by the fluid pump. The forward and reverse turbines preferably are driven in the same rotational direction. A rotatable output means, such as an output shaft, is drivingly connectible to the forward and reverse turbines. A selective engagement means selectively engages the forward and reverse turbines with the output shaft for selectively imparting rotation to the output shaft in either a first or second rotational direction. The reverse turbine is preferably disposed between the fluid pump and the forward turbine, and includes a plurality of vanes which are movable so as to govern the amount of power transferred from the fluid pump to the reverse turbine and the forward turbine. In one embodiment, counter-rotation means is provided between the reverse turbine and the output shaft so that, when the reverse turbine is engaged with the output shaft, the output shaft is driven in a rotational direction opposite its direction of rotation when engaged with the forward turbine. The counter-rotation means preferably comprises a planetary gearset including a ring gear to which the reverse turbine is mounted, a sun gear mounted at its center to the output shaft, and two or more planet gears disposed between the sun gear and the ring gear. A substantially cylindrical rotatable carrier is mounted concentrically to the output shaft along at least a portion of its length. The carrier has mounting means at one end pivotably connected to the planet gears. A brake mechanism is engageable with the carrier for selectively maintaining the carrier stationary, and a clutch mechanism is disposed between the carrier and the output shaft for selectively coupling the output shaft to the carrier. A one way clutch is disposed between the forward turbine and the output shaft for ensuring that the forward turbine can only transfer power to the output shaft in one direction of rotation. A lock-up clutch is provided for directly mechanically coupling the output shaft to the fluid pump, so as to bypass the effect of the fluid coupling in response to certain predetermined operating conditions.

With the above described construction, the brake mechanism and the clutch mechanism can be selectively engaged to prevent rotation of the output shaft, or to provide rotation of the output shaft in either a first or second direction of rotation.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
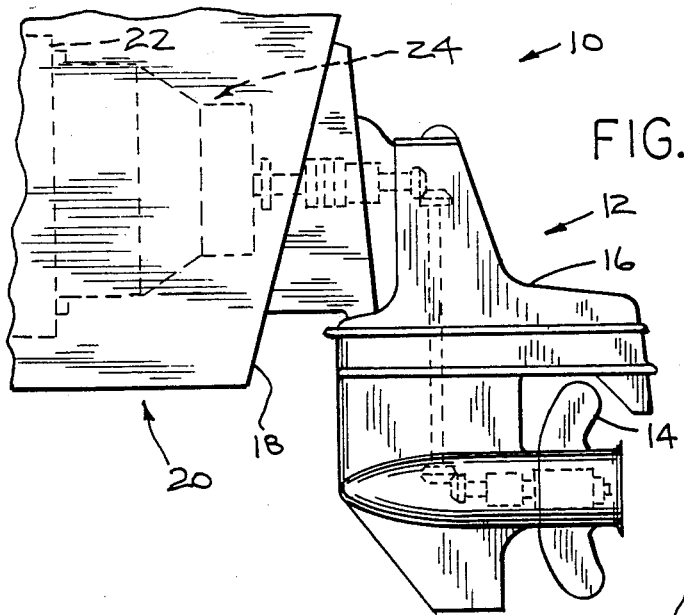
FIG. 1 is a partial elevation view showing the improved marine drive of the present invention.

As shown in FIG. 1 a marine drive 10, shown as an inboard-outboard stern drive, includes a propulsion unit 12 having a propeller 14 and a gear box 16, as is well known. These elements are mounted on the exterior of transom 18 of a boat 20. An engine 22 of conventional construction is mounted inside boat 20.

Figure 2:
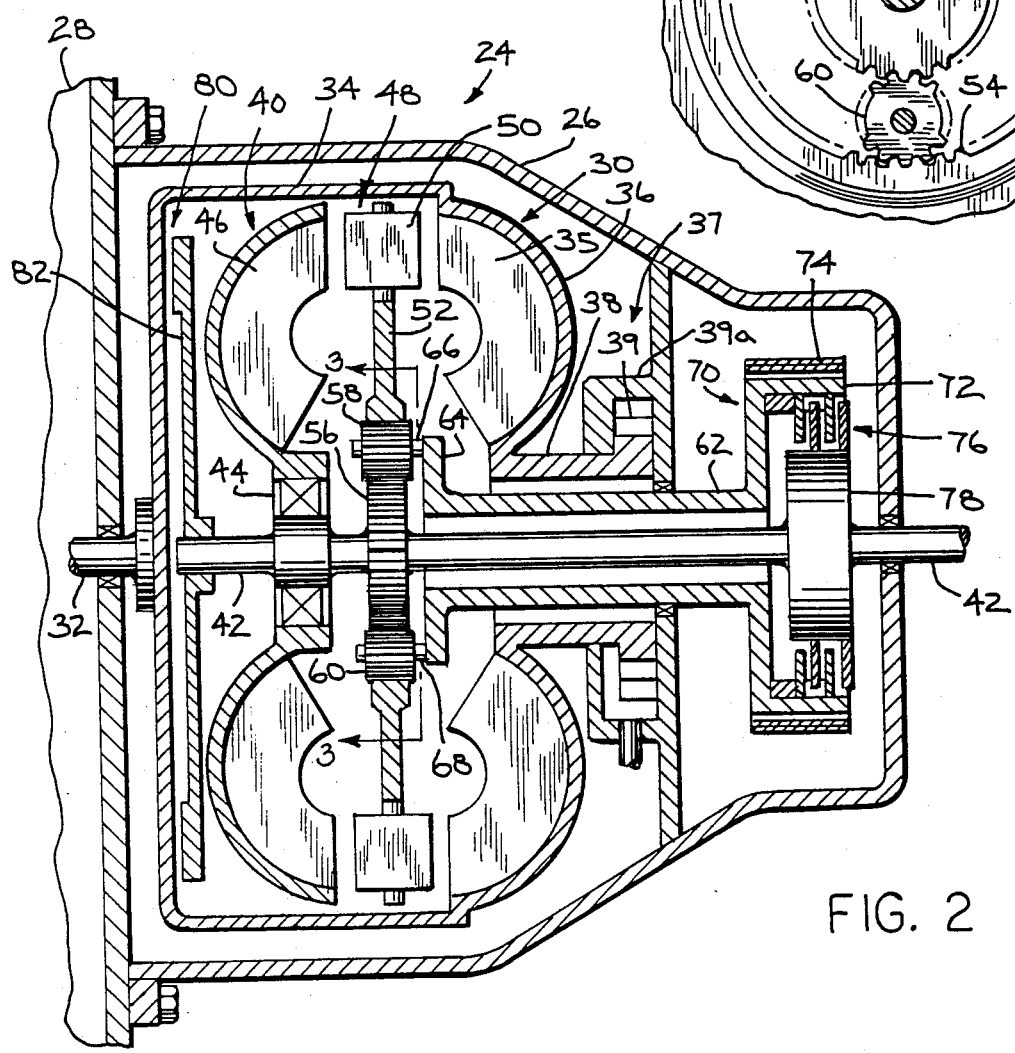
FIG. 2 is a sectional view showing the internal components of the fluid coupling marine transmission of FIG. 1.

In accordance with the present invention, a fluid coupling transmission 24 is interposed between engine 22 and propulsion unit 12. As shown in FIG. 2, fluid coupling transmission 24 has a housing 26 bolted or otherwise connected to the engine block 28 of engine 22. A fluid pump or driving member 30 is coupled to the crankshaft 32 of engine 22 through a cover assembly or casing 34, and forms the power input of transmission 24. Pump 30 includes a plurality of impeller blades 35 in cup-like frame 36, which circulate hydraulic fluid through casing 34.

An oil pump assembly, shown generally at 37, includes an impeller 38 connected to and rotatable with pump 30. Impeller 38 is provided with a plurality of vanes, such as shown at 39, contained within a pump housing 39a. Oil pump assembly 37 circulates oil and provides fluid pressure within casing 34.

A forward turbine, or driven member, 40 is disposed within casing 34 and connected to an output shaft 42 through a one way clutch 44. Turbine 40 includes a plurality of blades 46, which are driven by fluid circulated in casing 34 by pump 30. One way clutch 44 provides rotation of output shaft 42 in response to rotation of forward turbine 40 when turbine 40 rotates in a first rotational direction. One way clutch 44 prevents the transfer of power from forward turbine 40 to output shaft 42 when forward turbine 40 rotates in a second rotational direction. That is, when forward turbine 40 rotates in a second rotational direction, it spins freely about output shaft 42 without transferring power thereto.

Figure 3:
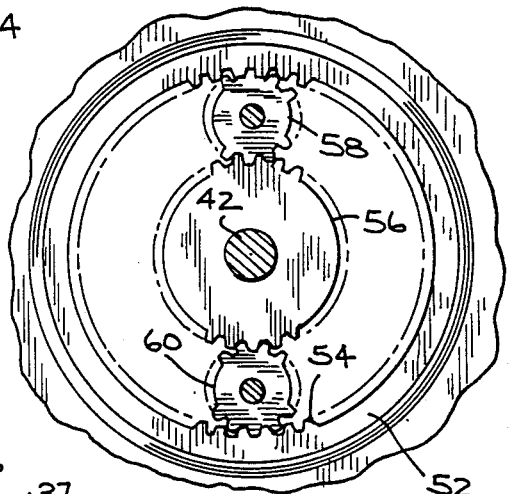
FIG. 3 is a partial sectional view taken generally along line 3—3 of FIG. 2.

A reverse turbine, indicated generally at 48, is disposed between pump 30 and forward turbine 40. Reverse turbine 48 includes a plurality of vanes 50, which are movable by a series of cranks (not shown) to variable position about a longitudinal axis through which vanes 50 are mounted. Reverse turbine 48 is connected to the outer circumference of a ring gear 52 of a planetary gearset. The inner periphery of ring gear 52 is provided with a plurality of teeth 54 (FIG. 3) thereabout, as is known. A sun gear 56 having a series of teeth about its outer periphery is rigidly connected to output shaft 42. A plurality of planet gears, two of which are shown at 58, 60, are provided between the outer periphery of sun gear 56 and the inner periphery of ring gear 52, as is known.

A substantially cylindrical carrier member 62 is mounted within transmission 24 so as to extend along at least a portion of output shaft 42, and is mounted concentrically therewith. Carrier member 62 is provided at its leftward end with a flange 64 which has pins 66, 68 extending therefrom, to which planet gears 58, 60, respectively, are pivotably mounted. At its rightward end, carrier member 62 is provided with a drum member 70, which includes an outer surface 72.

A brake band 74 is provided adjacent drum outer surface 72, and is selectively engageable therewith to selectively prevent rotation of drum member 70 and carrier member 62. A plate clutch mechanism, indicated generally at 76, is provided between the inner surface of drum outer surface 72 and a hub 78 rigidly fixed to output shaft 42. Clutch mechanism 76 is selectively actuable for selectively engaging drum member 70, and thereby carrier member 62, to output shaft 42.

A lock-up clutch 80, including a clutch plate 82, is provided toward the leftward end of output shaft 42. Lock-up clutch 80 is selectively actuable in response to certain predetermined operating conditions, such as engine or boat speed, to directly mechanically couple output shaft 42 to casing 34, and thereby to engine crankshaft 32.

In operation, transmission 24 works as follows. In neutral, to prevent rotation of output shaft 42 and thereby propeller 14, brake band 74 is engaged with drum outer surface 72 so as to hold drum 70, and thereby carrier member 62, stationary. Clutch mechanism 76 is engaged to couple output shaft 42 with drum outer surface 72. In this manner, output shaft 42 is prevented from rotating. In the neutral condition, reverse turbine 48 is prevented from rotating, and blades 50 of reverse turbine 48 are shifted to the reverse position. This allows forward turbine 40 to turn freely about output shaft 42 on one way clutch 44, thereby avoiding loading of engine 22.

To provide reverse operation, brake band 74 is engaged with the drum outer surface 72 to hold drum member 70 and carrier member 62 stationary. Clutch mechanism 76 is released, thereby decoupling output shaft 42 from drum member 70. Rotation of pump 30 causes forward rotation of reverse turbine 48, which is transferred through planet gears 58, 60 to sun gear 56, and thereby to output shaft 42. That is, ring gear 52 rotates during rotation of reverse turbine 48, which drives planet gears 58, 60 in the same direction of rotation. Such rotation of planet gears 58, 60 causes rotation of sun gear 56 in the opposite direction of rotation, which rotation is transferred thereby to output shaft 42. The planetary gearset is designed to overdrive the propeller in reverse to offset the lower efficiency of the propeller during such operation. The movable blades of reverse turbine 48 control the amount of power transmitted by reverse turbine 48 by providing variable deflection of fluid flow within casing 34. Maximum power is transmitted when blades 50 are positioned approximately 90° to fluid flow. Minimum power is transmitted when blades 50 are turned substantially parallel to fluid flow. The boat operator manually controls boat speed by adjusting the angular orientation of blades 50, and thereby the power transmitted by reverse turbine 48.

To drive boat 20 forward, brake band 74 is released from engagement with drum outer surface 72. Clutch mechanism 76 is applied, thereby coupling drum member 70 and carrier member 62 to output shaft 42. In this condition, planet gears 58, 60 are prevented from rotating, due to the engagement of planet gears 58, 60 with sun gear 56. Both reverse turbine 48 and forward turbine 40 are driven in the same direction of rotation by fluid pump 30. Rotation of reverse turbine 48 is transferred through the planetary gearset to output shaft 42, while forward turbine 40 drives output shaft 42 through one way clutch 44. Again, as in reverse operation, the boat operator can manually control boat speed by adjusting the angle of reverse turbine blades 50 to control the power transmitted from fluid pump 30.

At a preselected engine or boat speed, lock-up clutch 80 is engaged by applying clutch plate 82 to casing 34. In this manner, there is a direct mechanical connection of output shaft 42 to engine crankshaft 32, thereby bypassing the effect of fluid coupling transmission 24. In this condition, clutch mechanism 76 is released from engagement with output shaft 42, thereby allowing the fluid coupling and the gearset to spin freely about shaft 42, without absorbing any power.

Various alternatives and modifications are contemplated as being within the scope of the following claims particularly pointing out and distinctly claiming the invention.

We claim:

1. In a marine drive for a boat, said marine drive including an engine and a propulsion unit, the improvement comprising a fluid coupling interposed in the marine drive between the engine and the propulsion unit, said fluid coupling comprising:
    a rotatable fluid pump connected to the engine;
    a rotatable forward turbine adapted to be driven in a first rotational direction by said fluid pump;
    a rotatable reverse turbine adapted to be driven by said fluid pump;
    a rotatable output shaft drivingly connectable to said forward and reverse turbines and coupled to said propulsion unit;
    selective engagement means for selectively engaging said forward and reverse turbines with said output means for selectively imparting rotation to said output means in either a first or a second rotational direction; and
    counterrotation means provided between said reverse turbine and said output shaft so that, when said reverse turbine is selectively engaged with said output shaft, said output shaft is driven in a rotational direction opposite said first direction of rotation of said forward turbine, said counterrotation means comprising a planetary gearset, including a ring gear to which said reverse turbine is mounted, a sun gear mounted at its center to said output shaft, and two or more planet gears disposed between said sun gear and said ring gear.

2. The invention according to claim 1, wherein said reverse turbine is disposed between said fluid pump and said forward turbine.

3. The invention according to claim 2, wherein said reverse turbine includes a plurality of vanes, and wherein said vanes are movable so as to govern the amount of power transferred from said fluid pump to said reverse turbine, as well as from said fluid pump to said forward turbine.

4. The invention according to claim 1, wherein said selective engagement means includes forward power transfer means for transferring power from said forward turbine to said output shaft when said forward turbine rotates in said first rotational direction.

5. The invention according to claim 4, wherein said forward power transfer means comprises a one way clutch mounted between said output shaft and said forward turbine for transferring power from said forward turbine to said output shaft when said forward turbine rotates in said first rotational direction, and for preventing the transfer of power from said forward turbine to said output shaft when said forward turbine rotates in said second rotational direction by allowing said forward turbine to spin freely thereabout.

6. The invention according to claim 4, wherein said selective engagement means further comprises a cylindrical carrier concentrically mounted about a portion of the length of said output shaft, said carrier including mounting means at one end to which said two or more planet gears are rotatably mounted.

7. The invention according to claim 6, wherein said selective engagement means includes a clutch mechanism provided between said carrier and said output shaft for selectively coupling said carrier to said output shaft.

8. The invention according to claim 7, wherein said selective engagement means further includes a brake mechanism selectively engageable with said carrier for selectively preventing rotation thereof, so that said selective engagement means is capable of preventing rotation of said output shaft by engaging said brake mechanism with said carrier and coupling said carrier to said output shaft through said clutch mechanism, and said selective engagement means is capable of providing rotation of said output shaft in said first rotational direction by coupling said carrier to said output shaft through said clutch mechanism so as to prevent rotation of said planet gears and releasing said brake mechanism from said carrier so that, as said forward and reverse turbines rotate in response to said fluid pump, rotation of said forward turbine is transferred to said output shaft and rotation of said reverse turbine is transferred through said planetary gearset to said output shaft, and said selective engagement means is capable of providing rotation of said output shaft in said second rotational direction by engaging said brake mechanism with said carrier and releasing said clutch mechanism between said carrier and said output shaft so that rotation of said reverse turbine in said first rotational direction is transferred to said output shaft through said planet gears so as to cause rotation of said output shaft in said second rotational direction.

9. The invention according to claim 8, wherein said carrier is provided with a drum connected thereto, and wherein said brake mechanism engages the outer surface of said drum and said clutch mechanism is provided between the inner surface of said drum and said output shaft.

10. The invention according to claim 1, further comprising lock-up means for directly mechanically coupling said fluid pump to said output shaft in response to one or more preselected operating conditions.

11. The invention according to claim 10, wherein said lock-up means comprises a selectively actuable clutch connectable between said fluid pump and said output shaft.

12. A marine transmission adapted for interposition in a marine drive between the engine and the propulsion unit thereof, comprising:
a fluid coupling including a rotatable fluid pump connected to and rotatable in response to the engine;
a forward turbine adapted to be driven in a first rotational direction by said fluid pump;
a reverse turbine adapted to be driven in said first rotational direction by said fluid pump;
a rotatable output shaft to which said forward and reverse turbines are connectable;
a one way clutch disposed between said forward turbine and said output shaft so that said forward turbine transfers power to said output shaft only during rotation in said first rotational direction;
a planetary gearset disposed between said reverse turbine and said output shaft, said planetary gearset including an outer ring gear to which said reverse turbine is connected, a sun gear connected at its center to said output shaft, and two or more planet gears disposed between said ring gear and said sun gear;
a substantially cylindrical carrier concentrically mounted about a portion of the length of said output shaft to which said planet gears are pivotably mounted;
selectively engageable brake means for selectively preventing rotation of said carrier; and
selectively engageable clutch means disposed between said carrier and said output shaft for selectively coupling said carrier to said output shaft;
so that rotation of said output shaft can be selectively prevented by engaging said brake means with said carrier and coupling said carrier to said output shaft through said clutch mechanism, and rotation of said output shaft in a first rotational direction can be imparted by coupling said carrier to said output shaft through said clutch mechanism so as to prevent rotation of said planet gears and releasing said brake means so that, as said forward and reverse turbines rotate in response to said fluid pump, rotation of said forward turbine is transferred to said output shaft by said one way clutch and rotation of said reverse turbine is transferred to said output shaft through said planetary gearset, and rotation of said output shaft in a second rotational direction can be imparted by engaging said brake means with said carrier and releasing said clutch means between said carrier and said output shaft so that rotation of said reverse turbine in said first rotational direction is transferred to said output shaft through said planet gears so as to cause rotation of said output shaft in said second rotational direction.

13. The invention according to claim 12 wherein said reverse turbine is disposed between said forward turbine and said fluid pump, and includes a series of movable vanes which govern the speed of rotation of said reverse turbine and which control the direction and speed of rotation of said forward turbine.

* * * * *